United States Patent
Dalke et al.

[15] 3,660,233
[45] May 2, 1972

[54] NUCLEAR REACTOR UPPER CORE GRID

[72] Inventors: Charles Arthur Dalke, San Jose; Cedric L. Child, Cupertino, both of Calif.

[73] Assignee: General Electric Company

[22] Filed: Nov. 12, 1969

[21] Appl. No.: 875,928

[52] U.S. Cl............................176/87, 85/46, 151/22, 176/78, 287/189.36 F
[51] Int. Cl............................................G21c 3/00
[58] Field of Search................176/87, 61, 86, 30, 64, 76, 176/78; 29/457, 456, 445; 85/46; 151/22; 287/189.36 F

[56] References Cited

UNITED STATES PATENTS

| | | | |
|---|---|---|---|
| 1,921,629 | 8/1933 | McKee | 189/36 F X |
| 197,466 | 11/1877 | Harvey | 151/22 |
| 2,206,223 | 7/1940 | Dearborn | 85/46 |
| 3,212,978 | 10/1965 | Short et al | 176/61 X |
| 3,212,979 | 10/1965 | Silverblatt | 176/61 X |

Primary Examiner—Carl D. Quarforth
Assistant Examiner—Gary G. Solyst
Attorney—Ivor J. James, Jr., Samuel E. Turner, Frank L. Neuhauser, Oscar B. Waddell and Joseph B. Forman

[57] ABSTRACT

A fuel assembly top guide for the fuel core of a nuclear reactor including screws having threads with an acute included angle between the thread pressure flank face and the screw axis for fastening the notched intersections of the beams forming the top guide.

6 Claims, 7 Drawing Figures

INVENTORS:
CHARLES ARTHUR DALKE
CEDRIC L. CHILD

BY: James E. Turner
ATTORNEY

NUCLEAR REACTOR UPPER CORE GRID

BACKGROUND

In a known type of nuclear reactor, for example as used in the Dresden Nuclear Power Station near Chicago, Ill., the reactor core is of the heterogeneous type. That is, the core comprises a plurality of fuel assemblies vertically arranged in an array to form the nuclear reactor core capable of self-sustained nuclear fission reaction. The core is contained in a pressure vessel wherein it is submersed in a working fluid, such as light water, which serves both as a coolant and as a neutron moderator.

Each fuel assembly comprises a tubular flow channel containing an array of elongated fuel elements or rods supported between upper and lower tie plates. The fuel assemblies are supported in the pressure vessel between an upper core grid or fuel assembly top guide and a lower core support plate.

The lower core support plate laterally supports the fuel assemblies and forms a coolant pressure boundary between lower plenum and core region. The upper core grid or top guide performs the dual function of maintaining the appropriate spacing between fuel assemblies and restraining the fuel assemblies from lateral movement during, for example, seismic disturbances.

Since the fuel assemblies are rather closely spaced, the beams which form the top guide are of limited thickness. Thus the top guide beams are in the order of three-eighths of an inch thick, about thirteen inches high and up to 200 some inches long. The top guide structure is formed of two parallel arrays of these beams crossing at right angles and formed with interlocking notches at their intersections in an eggcrate-like construction.

Because of the necessary notching to provide interlocking, it is found that the resulting top guide structure has less than the desired rigidity. Attempts to improve the rigidity of the structure by welding the beams together at the interlocked intersections has not been successful because of the resulting distortion of the structure.

SUMMARY

An object of the invention is to provide a fuel assembly top guide of increased rigidity while maintaining the square cross section of the fuel assembly passages and without otherwise distorting the structure.

This and other objects of the invention are achieved by providing fastening screws at the intersections of the beams, the screw threads and the matching threads at the beam intersections being formed with an acute angle so that the beams are longitudinally stressed, that is, tightening of the screws urges the beams toward the screws thus tightening the top guide structure in the manner of a split nut.

DRAWING

An embodiment of the invention is described in greater detail hereinafter with reference to the drawing wherein.

DESCRIPTION

Figure 1:
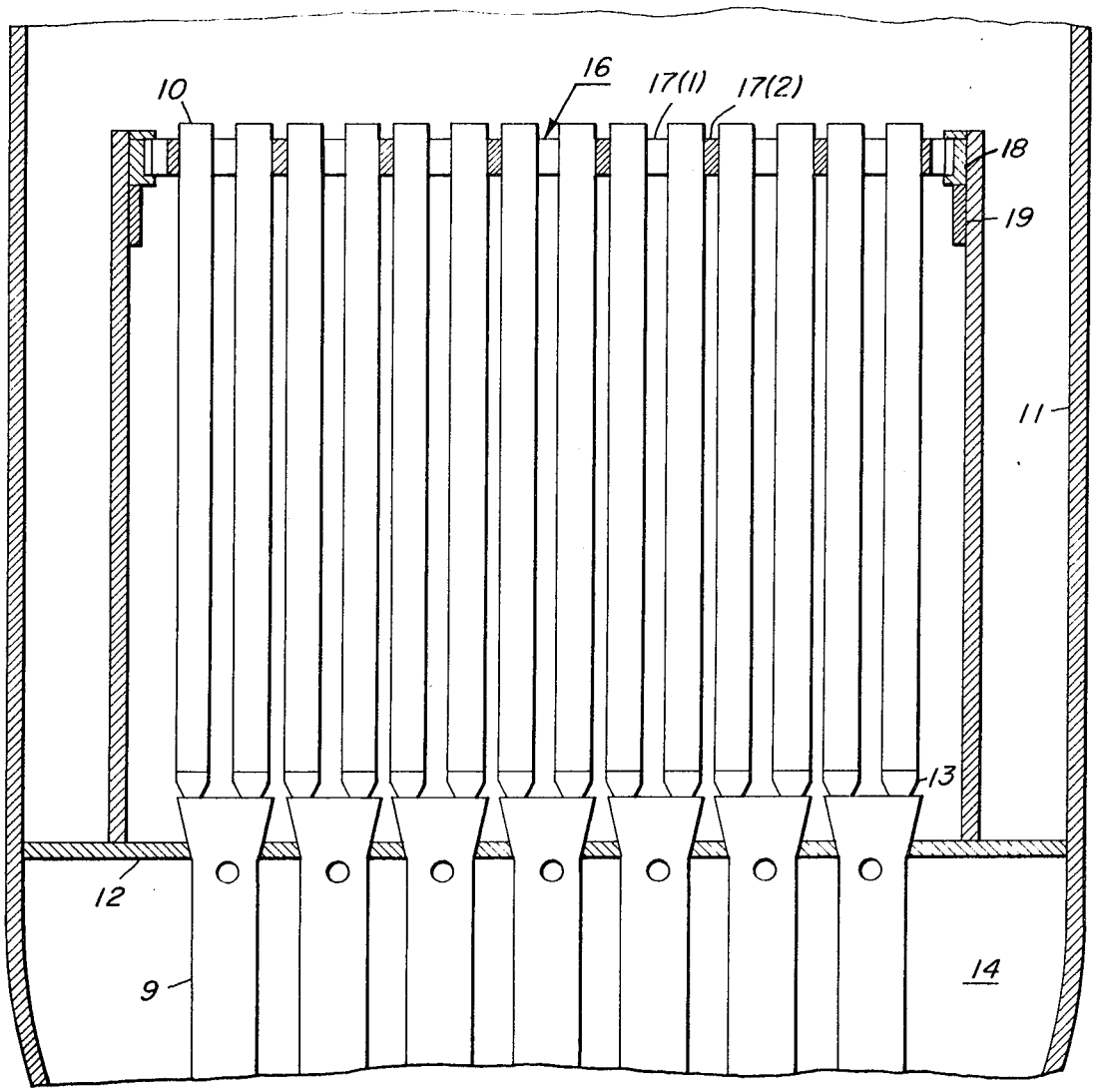
FIG. 1 illustrates a nuclear reactor core structure.

A nuclear reactor fuel core is illustrated in FIG. 1. The core includes a plurality of replaceable fuel assemblies 10 arranged in spaced relation and supported in a pressure vessel 11 by a plurality of control rod guide tubes 9 penetrating a plate 12. Each fuel assembly includes a tapered nose piece 13 which engages a support socket in a fuel support casting located at the top of the control rod guide tube. (The guide tube and the end of the nose piece are formed with openings for receiving coolant from a pressurized coolant supply chamber 14.)

At their upper ends, the fuel assemblies 10 are maintained in alignment and laterally supported by a top guide 16. The top guide 16 is formed of a plurality of cross-laced beams 17(1) and 17(2) which are formed with matching, interlocking slots at their intersections. The ends of these beams engage a channel-shaped mounting rim 18 which is supported by a shoulder 19 secured to an annular shroud surrounding the core or otherwise secured in the pressure vessel 11.

Figure 2:
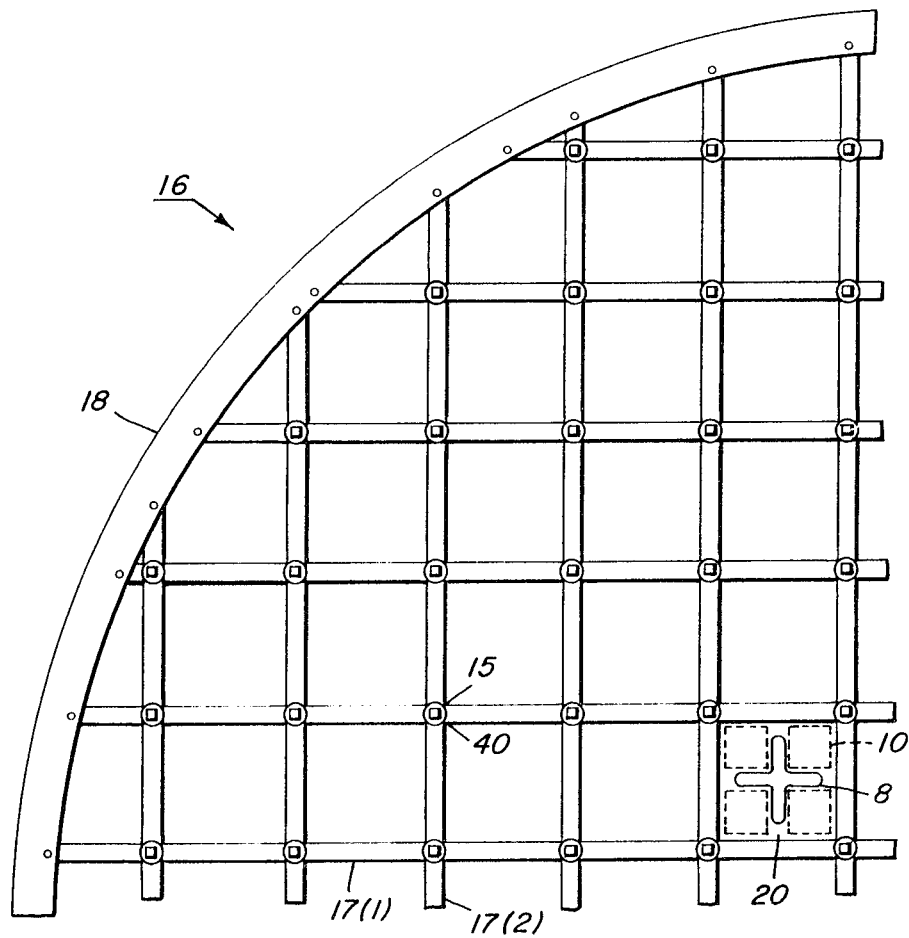
FIG. 2 is a plan view of a segment of the fuel assembly top guide.

A segment of the top guide 16 is illustrated in plan or top view in FIG. 2. The intersecting and interlocking beams 17(1) and 17(2) form a plurality of fuel assembly passages of square cross section. As illustrated at 20, each passage accommodates four fuel assemblies 10 and a control rod 8 of cruciform cross section.

Figure 3:
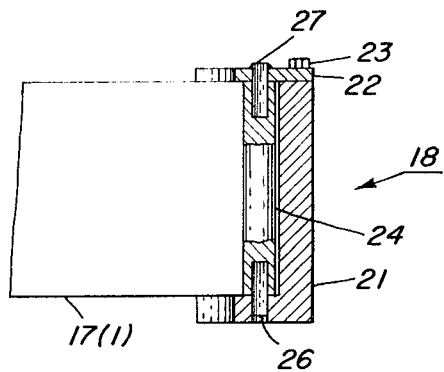
FIG. 3 is an elevation view of the details of the engagement of the top guide with its mounting rim.

Details of the engagement of the ends of the beams 17(1) and 17(2) with the mounting rim 18 are shown in FIG. 3. The mounting rim 18 is formed of a support angle 21 and a retainer ring 22 secured to the support angle 21 with a plurality of cap screws 23. Welded to each end of each of the beams 17(1) and 17(2) is a beam end bar 24. The end bars 24 are of greater thickness than the relatively thin beams 17(1) and 17(2) to provide adequate cross section of material for attachment to the mounting rim 18 by a lower retainer pin 26 and an upper retainer pin 27. The pins 26 and 27 are retained in position by tack welds.

Figure 4:
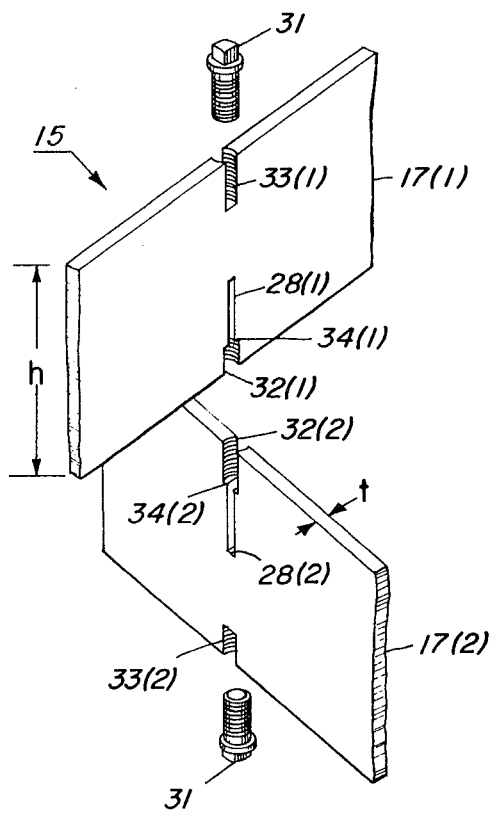
FIG. 4 is an exploded perspective view of the details of a typical intersection of the beams of the top guide.

Details of a typical intersection 15 of the beams 17(1) and 17(2) are shown in exploded perspective view in FIG. 4. At each such intersection, the beams 17(1) are formed with downwardly opening slots 28(1). The beams 17(2) are formed with similar but upwardly opening slots 28(2). The slots 28(1) and 28(2) extend through the height h of the beams so that, when assembled as shown in FIG. 2, the beams interlock in an eggcrate-like manner.

The beams 17(1) and 17(2) are relatively thin, their thickness t being in the order of three-eighths of an inch. The height h is typically in the order of 13 inches and the longest beams may be over 200 inches in length. Because of these dimensions and because of the slots 28(1) and 28(2), the assembled top guide lacks the desired rigidity in the absence of fastening or reinforcement of the intersections 15. Attempts to fasten the intersections by welding have been unsuccessful because of the resulting warping and distortion of the top guide assembly. Machining the fuel assembly passages to size after welding has been considered but rejected as unduly expensive and time consuming. Various well-known clamping arrangements were found too costly, ineffective, or unuseable because of space limitations.

Attempts to stiffen the intersections by the use of screws having ordinary threads were also unsuccessful since the ends of the slots 28 and 29 were found to behave as split nuts. A screw with ordinary V-shaped threads, for example, exerts an outward force on the matching female thread at the slot ends with the result that the slots are spread rather than tightened.

The problem is solved in accordance with the present invention by the use of fastening screws 31 formed with acute angle threads which upon tightening provide a force toward the screw. As shown in FIG. 4 a fastening screw 31 is employed at both the bottom and the top of the intersections 15. To accomplish this the end portion 32(1) of the slot 28(1) is tapped and a short threaded slot 33(1) is formed in the beam 17(1) opposite the slot 28(1). The screws 31 are greater in diameter (for example, five-eighths of an inch) than the thickness $t$ of the beams. Thus a shoulder 34(1) is formed at the end of the threaded portion 32(1). The beams 17(2) are tapped in a similar manner.

Figure 5:
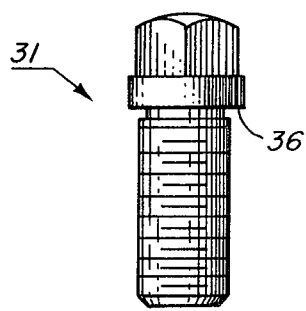
FIG. 5 illustrates one form of an intersection fastening screw.
Figure 6:
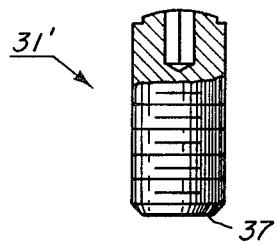
FIG. 6 illustrates an alternate form of an intersection fastening screw.

As shown in FIG. 5, the screws 31 are formed with a shoulder 36 which, upon tightening of the screw (for example, in the threaded slot 33(1) and the threaded end portion 32(2) of the slot 28(2) engages the edge surfaces of the beams 17(1) and 17(2). An alternate form of a fastening screw is illustrated in FIG. 6 as a headless screw 31' which may be used when it is desirable to avoid protuberances above the surface of the beams 17(1) and 17(2). In this case the end 37 of the screw 31' bottoms for tightening against, for example, the shoulder 34(2) and against the bottom of the threaded slot 33(1).

Figure 7:
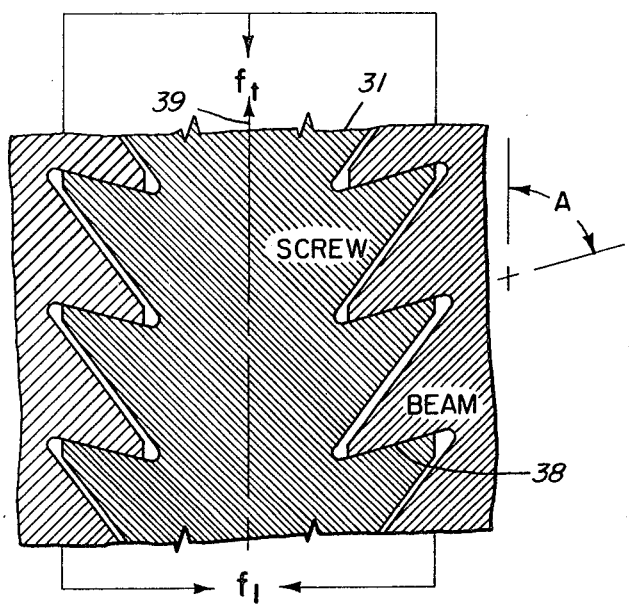
FIG. 7 is a fragmentary cross section view illustrating details of the acute angle thread.

Details of the acute angle thread are shown in the cross section view of FIG. 7. The thread is saw-toothed like in cross section form with the thread pressure flank face 38 at an acute angle A formed between the crest portion of the flank face and to the longitudinal axis 39 of the screw. Thus when the male and female threads are tightened with a force $f_t$ there is a resultant lateral force $f_l$ urging the beam toward the screw. The magnitude of the lateral force $f_l$ is a function of the angle A. For a given tightening force $f_t$ the lateral force $f_l$ can be calculated for any given angle A. The force $f_l$ is zero at an angle A of 90° and the force $f_l$ increases as angle A is decreased toward 0°. However, a decrease in the angle A also tends to decrease the strength of the threads and threads having angles less than 45° are more difficult to manufacture. Thus a compromise must be made among the various design parameters including the strength of the threads, the angle A and the pitch of the thread.

(The thread shape illustrated in FIG. 7 is somewhat similar to the "barbed threads" shown by H. A. Harvey in U. S. Pat. No. 197,466. However, the Harvey thread is designed to upset upon tightening so as to lock in his annular nut.)

A screw found suitable for use in the improved fuel assembly top guide of the invention is five-eighths inch diameter, with a threaded length of 1½ inch, a thread pitch of 12 threads per inch and an angle A of 75.5°. With this thread angle the lateral force $f_l$ is about 25 percent of the tightening force $f_t$.

A suggested procedure for assembling the top guide structure is as follows: The beams 17(1) and 17(2), being prenotched and fitted with end bars 24, are placed in position on the support angle 21. The retainer ring 22 is attached to the support angle 21. The beams 17(1) and 17(2) are aligned by optical or other means and clamped in position with respect to the mounting rim 18. Holes for the retainer pins 26 and 27 are drilled and the pins installed and tack welded in place. The beam intersections are tapped to receive the screws 31. The screws 31 are installed, tightened and tack welded in place (with welds 40 FIG. 2). The thus assembled top guide is then ready for insertion in the pressure vessel atop the shoulder 19.

Thus what has been described is an improved fuel assembly top guide using fastening screws with acute angle threads at the intersections of the guide beams to solve a substantial problem in maintaining the form and rigidity of such structures.

What is claimed is:

1. In a nuclear reactor, a fuel assembly upper core grid comprising: a plurality of relatively thin, notched beams arranged in a cross-laced interlocking array to form a plurality of fuel assembly passages, and a respective screw engaging said beams at each of the notched intersections of said beams, said screw being formed with sawtoothed threads having an acute angle between the crest portion of the thread pressure flank face and the screw axis and said beams being formed with matching female threads whereby upon tightening said screws against said beams the beams are urged toward said screws.

2. The top guide of claim 1 a respective screw engaging said beams at the top and at the bottom of each of said intersections.

3. The top guide of claim 1 wherein said acute angle is between 45.0° and 89.99°.

4. The top guide of claim 1 wherein said screws are greater in diameter than the thickness of said beams.

5. The top guide of claim 1 wherein said beams are supported by and secured to an annular support member engaging the ends of said beams.

6. The top guide of claim 5 wherein each end of each of said beams is fitted with an end bar of greater thickness than said beams for attachment to said support member.

* * * * *